United States Patent
Liu (10) Patent No.: US 9,264,239 B2
(45) Date of Patent: Feb. 16, 2016

(54) METHOD AND APPARATUS FOR INCREASING THE NUMBER OF THE POWERED DEVICES SUPPORTED BY THE POE SYSTEM

(75) Inventor: Jun Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 862 days.

(21) Appl. No.: 13/142,821

(22) PCT Filed: Feb. 25, 2009

(86) PCT No.: PCT/CN2009/000201
§ 371 (c)(1),
(2), (4) Date: Jun. 29, 2011

(87) PCT Pub. No.: WO2010/096950
PCT Pub. Date: Sep. 2, 2010

(65) Prior Publication Data
US 2011/0298428 A1    Dec. 8, 2011

(51) Int. Cl.
*H02J 7/04* (2006.01)
*H04L 12/10* (2006.01)
*G06F 1/26* (2006.01)

(52) U.S. Cl.
CPC ........... *H04L 12/10* (2013.01); *G06F 1/266* (2013.01)

(58) Field of Classification Search
USPC ................................................ 320/114, 149
See application file for complete search history.

(56) References Cited

U.S. PATENT DOCUMENTS

| 5,726,636 A | 3/1998 | Hayes, Jr. |
| 2008/0005601 A1* | 1/2008 | Diab ............................. 713/300 |
| 2010/0253281 A1* | 10/2010 | Li ................................. 320/108 |

FOREIGN PATENT DOCUMENTS

| CN | 1290862 | 4/2001 |
| CN | 1638228 | 7/2005 |
| JP | 2008059112 | 3/2008 |
| JP | 2008245391 | 10/2008 |
| KR | 20010062483 | 7/2001 |

* cited by examiner

*Primary Examiner* — Robert Grant
(74) *Attorney, Agent, or Firm* — Patti & Malvone Law Group, LLC (57) ABSTRACT

In order to increase the number of the powered devices that can be supported by the Ethernet power supply system, the present invention proposed to equip the powered device with an electrical energy storage device, namely shift the power timely shift the power supplying capability of the power sourcing equipment. The power sourcing equipment charges the electrical energy storage device, and then the powered device is supplied by the electrical energy storage device under usual situations. Thus the number of the powered devices that can be supported by the Ethernet power supply system is increased without increasing the supplying capability of the electrical quantity of the power sourcing equipment. Using the solution in the present invention, the capacity of the powered devices in the POE system is increased without having to change the hardware of the power sourcing equipment, and without having to change the wiring.

15 Claims, 3 Drawing Sheets

METHOD AND APPARATUS FOR INCREASING THE NUMBER OF THE POWERED DEVICES SUPPORTED BY THE POE SYSTEM

FIELD OF THE INVENTION

The present invention relates to communication network, in particular relates to the power sourcing equipment and the powered device in the Ethernet.

BACKGROUND OF THE INVENTION

Power Over Ethernet (PoE) refers to the technology of providing IP-based terminals, such as an IP phone, an Access Point of WLAN, a web camera, etc., with DC power supply, while transmitting data signals for them, without changing the wiring fundamental structure of the existing Cat.5 of Ethernet. PoE technology can guarantee the proper operation of the existing network while making sure that the existing structuring wiring is safe, and cut down the cost to the utmost extent.

PoE is also referred to as Power over LAN or Active Ethernet, sometimes also referred to as Ethernet powering. It is the standard specification of transmitting data and electrical power at the same time utilizing the Ethernet transmission cable in the existing standard, and maintains the compatibility with the existing Ethernet system and users. IEEE 802.3af standard is a standard base on POE, it adds the standard related to powering directly over network cable on the basis of IEEE 802.3, and it is an extension of the existing Ethernet standard. And is the first international standard about power supply distribution.

A complete Ethernet power supply system comprises the power sourcing equipment (PSE) and the powered device (PD), the contact between both of them is established based on IEEE802.3af standard for the information about equipment type, consumption level and connection situation about the powered device, etc, based on which the power sourcing equipment controls to power the powered device over Ethernet.

Figure 1:
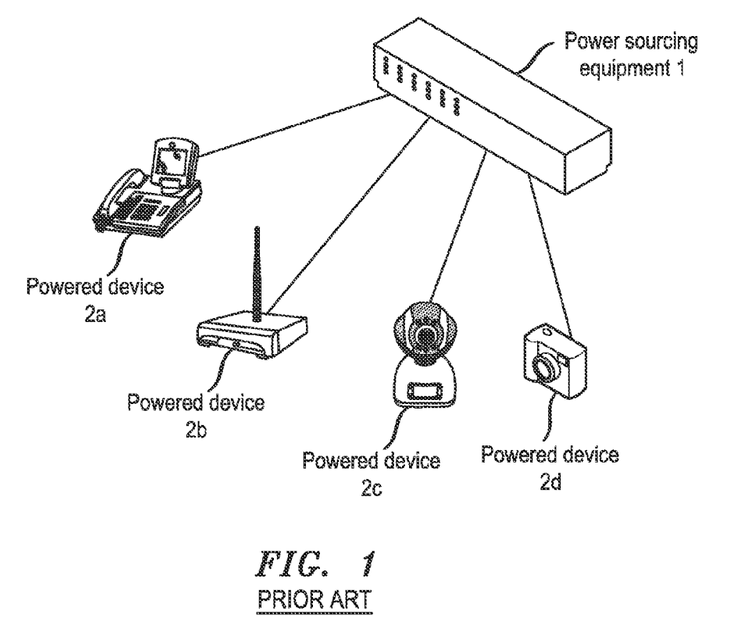
FIG. 1 shows the topology of a typical Ethernet power supply system.

The topology of a typical Ethernet power supply system is shown in FIG. 1. A power sourcing equipment 1, for example a hub with power supply, provides the twisted pair of LAN with power supply. At the end of the twisted pair, the power supply is used to drive the powered device 2, including an IP phone, a wireless access point, a camera and other devices.

Figure 2A:
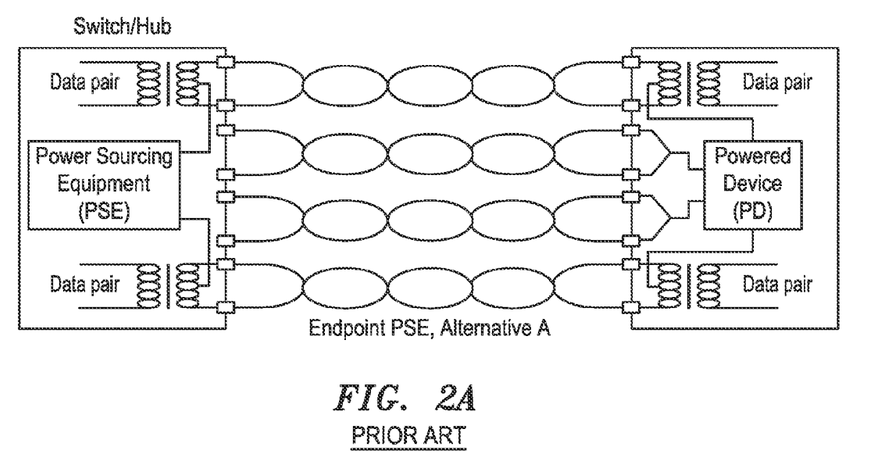
FIGS. 2A, 2B, 2C show three different powering methods for the power sourcing equipment.
Figure 2B:
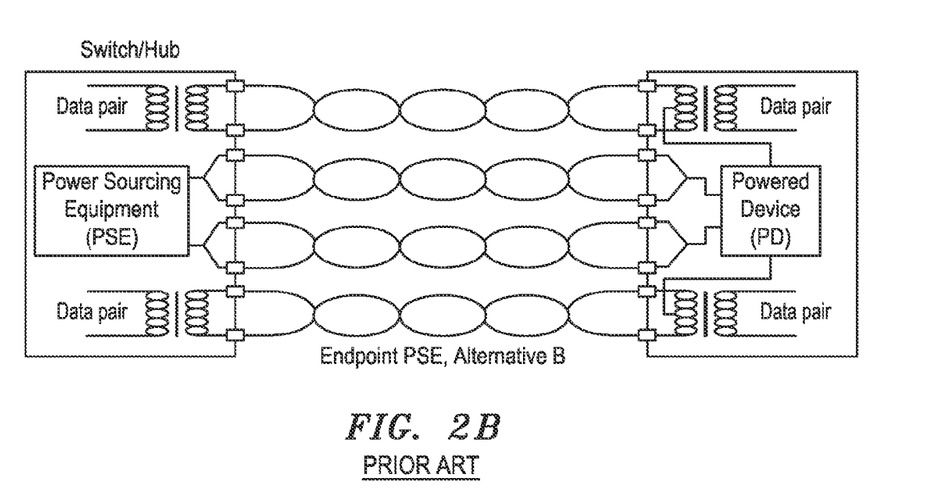
Figure 2C:
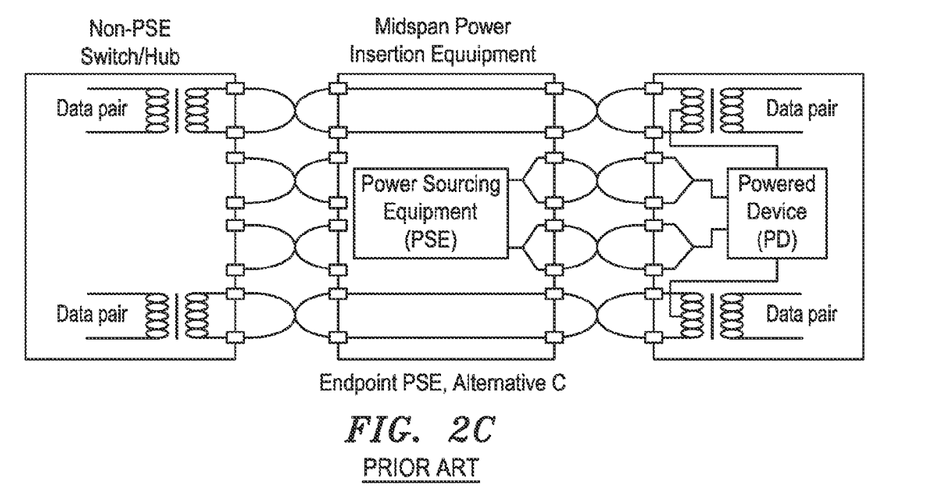

Now referring to FIG. 2A-2C, methods for providing the PoE compatible powered device with DC power using the Ethernet transmission cable are shown respectively:

A method is "End-Span" (or endpoint), comprising the PoE switch/hub with PoE function installed inside, as shown in FIGS. 2A and 2B, wherein, two methods are comprised, method A is shown in FIG. 2A, wherein the power transmission uses the idle pin that are not transmitting data; the method B is shown in FIG. 2B, the DC current is transmitted over the cable that is used to transmit data, since the power transmission and the data transmission share the same cable, configuring a specific cable for power transmission is no longer necessary.

Another method is "Midspan", as shown in FIG. 2C, for inserting a device having PoE function between the traditional Ethernet switch and the powered device, the inserted device applies method A, and the power transmission uses the idle pin that are not transmitting data, such as the power sourcing equipment 1 in FIG. 2C.

For the power sourcing equipment, the procedure of the power supply in the Ethernet can be described as follows:
1. Detection When it starts, the power sourcing equipment outputs a very small voltage on the port, until it detects the end of its cable is connected to a powered device supporting IEEE 802.3af standard.

2. Powered Device Classification

When powered device is detected, the power sourcing equipment may classify the powered device, and evaluate the power consumption of the powered device.

3. Power Up

During a start up period with a configurable time (normally less than 15 μs), the power sourcing equipment starts from a low voltage to power the powered device, until it provides normal working voltage, for example 48V DC power supply.

4. Operating

The power sourcing equipment provides the powered device with stable and reliable 48V DC voltage, so as to satisfy the power consumption less than 13 W of the powered device. It may provide power up to 20 W-40 W in the PoE plus system.

5. Power Down

If the powered device is taken out of the network physically or electrically, the power sourcing equipment will stop powering the powered device quickly (normally within 300-400 ms), and start the detection procedure to detect whether there is a powered device connected to the end of the cable.

During the whole procedure, some events, such as over load, short circuit of the power consumption of the powered device, exceeding the power supply load of the power sourcing equipment, may cause interrupt to the whole procedure, then the power sourcing equipment will start from the first step of detection procedure.

According to the description above, if the powered device has no external power supply, the power sourcing equipment needs to power it until the powered device is taken out of the network physically or electrically.

It can be understood that the capacity of the Ethernet power supply system depends on the supplying capability of the electrical quantity of the power sourcing equipment and the maximum power consumption of each powered device.

Using the following parameters as example, the capacity of the Ethernet power supply system is analyzed in detail:
i) the supplying capability of the electrical quantity of the power sourcing equipment is 1000 W (Watt),
ii) the standby power consumption of powered device is 1 W;
iii) the maximum power consumption of the powered device is 100 W.

If all the powered device are in standby mode, the power sourcing equipment may support 1000/1=1000 powered devices; if all the powered device are in the maximum power consumption mode, the power sourcing equipment may only support 1000/100=10 powered devices. Thus, considering the security factors, if all the powered device are in the maximum power consumption mode, the number of the powered devices that can be supported by the system, namely the capacity of the Ethernet power supply system is only 10.

Using a phone system as an example, wherein, the powered devices are all IP phones. According to the experience, not all the phones are under calling mode at the same time, namely not all the phones are in the large power consumption mode. Usually, there are only 30% phones used at the same time, and the duration of most of the callings is less than 5 minutes. If the power sourcing equipment 1 provides the powered device 2 with power according to the situation that all the powered device are in the maximum power consumption mode, the number of the powered device that can be supported by the power sourcing equipment 1 is quite limited.

In order to extend the number of the powered device that can be supported by the Ethernet power supply system, if solely the supplying capability of the electrical quantity of the power sourcing equipment is enlarged, it will make the design of the power sourcing equipment more complicated, thus the cost will be increased; solely enlarging the supplying capability of the electrical quantity of the power sourcing equipment also needs to solve the problem of cooling; if external DC/AC power supply is used, the advantage of Ethernet power sourcing equipment will be lost. Thus, how to enlarge the capacity of the Ethernet power supply system effectively is a problem demanding prompt solution.

SUMMARY OF THE INVENTION

In order to increase the number of the powered devices that can be supported by the Ethernet power supply system, the present invention proposed to equip the powered device with an electrical energy storage device, namely timely shift the power supplying capability of the power sourcing equipment. The power sourcing equipment charges the electrical energy storage device, and then the powered device is supplied by the electrical energy storage device under usual situations. Thus the number of the powered devices that can be supported by the Ethernet power supply system is increased without increasing the supplying capability of the electrical quantity of the power sourcing equipment.

According to a first aspect of the invention, a method, in a power sourcing equipment of the Ethernet, of powering a powered device is proposed, wherein, the method comprises the following steps: determining whether a predetermined charging condition is satisfied; charging an electrical energy storage device of the powered device, when the predetermined charging condition is satisfied, the electrical energy storage device being used to provide the powered device with a working power supply.

According to a second aspect of the invention, a method, in a powered device of the Ethernet, for assisting a power sourcing equipment to power the powered device, wherein the powered device comprises an electrical energy storage device, the aiding method comprises a step of: sending a charging related information to the power sourcing equipment.

The advantages of the present invention is as follows:
1. no need to change the hardware of the power sourcing equipment;
2. the powered device capacity of the Ethernet power supply system is increased;
3. no need to change the wiring.

BRIEF DESCRIPTION OF THE DRAWINGS

By reading the detailed description of the non-restrictive embodiments with reference to the following drawings, other features, objects and advantages of this invention will become apparent.

Wherein, same or similar reference numerals refer to the same or similar means (block) or steps.

DETAILED DESCRIPTION OF EMBODIMENTS

Referring to FIG. 1, the application scenario of the present invention is described as follows: the power sourcing equipment 1 shown in FIG. 1 may be integrated with a switch or a hub, as shown in FIGS. 2A and 2B; or they may be separated, as shown in FIG. 2C. It may be the case that a power sourcing equipment 1, for example a hub with power supply, provides the twisted pair of LAN with power supply. Besides, the power sourcing equipment 1 may also comprise a switch or a hub having power supply function. As shown in FIG. 1, at the end of the twisted pair, the power supply is used to drive the powered device 2, including the powered device 2a: an IP phone, the powered device 2b: an access point, such as Bluetooth access point, WLAN access point, the powered device 2c: web video, and the powered device 2d: web camera. Of course, the powered device 2 may further comprise lighting operator, web printer, wireless bridge, security system of a building, such as card reader for the entrance guard and the monitor system, PDA (Personal Digital Assistant) or laptop, etc.

Wherein, the powered device 2 further comprises an electrical energy storage device (not shown), for storing electrical energy from the power sourcing equipment 1, and provide the powered device 2 with working power supply.

The electrical energy storage device may be rechargeable battery or capacitor with large capacity, such as supercapacitor, the capacity of the rechargeable battery or capacitor may be chosen by the producer of the powered device according to the practical situation, typically, the capacity of the supercapacitor may be 1 Farad up to thousands of Farad or even larger. In comparison with the normal chemical rechargeable battery, the supercapacitor charges faster and has higher energy conversion efficiency, because the manner of its energy storage is electrical energy, which only causes loss on the charging or discharging circuits. While the normal chemical rechargeable battery needs to convert between chemical energy and the electrical energy, therefore, has greater loss.

The flow chart of the method according to one embodiment of the present invention is described in combination with FIG. 3 in the following.

Figure 3:
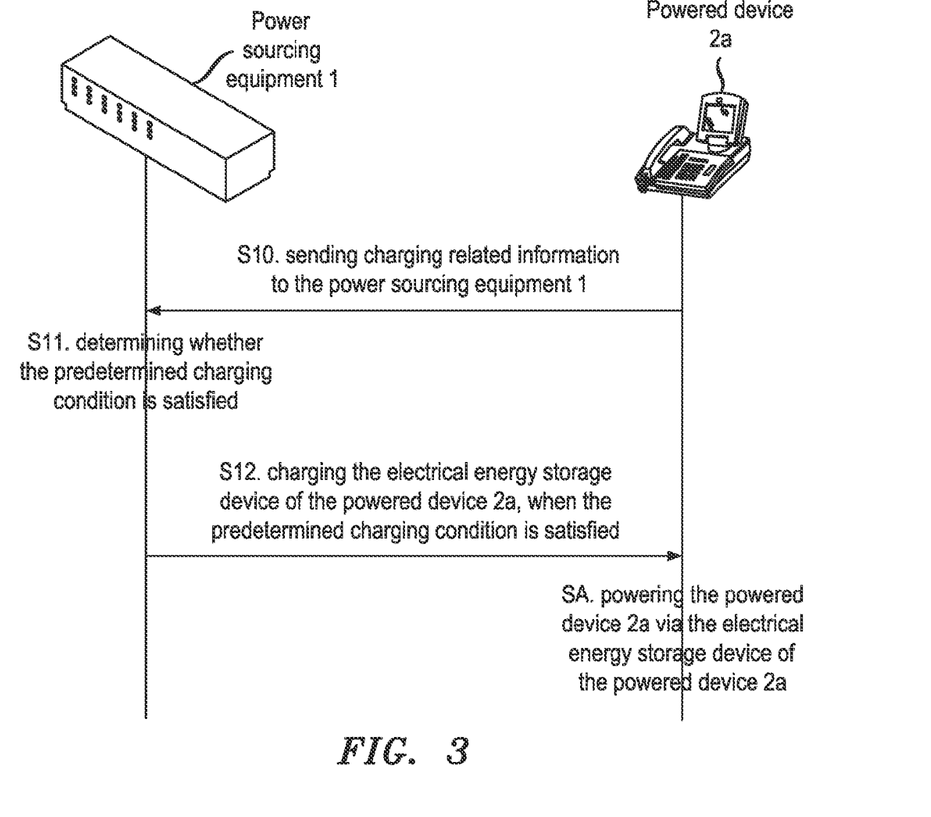
FIG. 3 shows a flow chart of the method according to one embodiment of the invention.

In FIG. 3, the present invention is first described using the powered device 2a, namely IP phone as an example. It can be understood by those skilled in the art, the powered device may be other devices that support 802.3af protocol. In the following, the example where the IP phone is the powered device 2 is described, it can be understood, that it may be other devices supporting other protocol. The example given in the following is only illustrative, and the present invention may also be applied to other powered device in the Ethernet power supply system.

The present invention starts from step S10.

In step S10, the powered device 2a sends a charging related information to the power sourcing equipment 1. The charging related information may comprise one or more of the following items:

An Indicating Information for the Electrical Quantity of the Electrical Energy Storage Device The indicating information for the electrical quantity may be an indicating information for the electrical quantity left, or may be an indicating information for the electrical quantity that has been used. It may be represented in a relative value form, or in an absolute value form. For example, the electrical quantity left may be represented as 10% in the relative value form, or the electrical quantity that has been used is 90%, the electrical quantity left is represented in the absolute value form as 50 mAh, or the electrical quantity that has been used is 1500 mAh.

It can be understood, that the powered device 2a may obtain the indicating information for the electrical quantity of the electrical energy storage device by the way of obtaining the voltage of the electrical energy storage device, due to that there exists a certain known relationship between the voltage of the battery and the electrical quantity left. Of course, the powered device 2a may obtain the electrical quantity left/used in other manners. Because it is known by those skilled in the art, the detailed description will be omitted here.

A Charging Request Message

In a variant embodiment, after the powered device 2a obtains the indicating message for the electrical quantity of the electrical energy storage device, the powered device 2a further determines whether it is necessary for the power sourcing equipment 1 to charge the electrical energy storage device, according to the initial/dynamic configuration of the producer or the user.

For example, the configuration of the producer or the user is pre-stored in the powered device 2a: when the left electrical quantity of the electrical energy storage device is lower than a predetermined threshold, for example 30% or 100 mAh, or equivalently, the electrical quantity that has been used is higher than another predetermined threshold, for example, 70% or 1000 mAh, the powered device 2a determines an indicating message that the power sourcing equipment 1 needs to charge the powered device 2a. Thus the powered device 2a determines that it is necessary for the power sourcing equipment 1 to charge the electrical energy storage device, according to this indicating message, and according to the electrical quantity left/electrical quantity that has been used obtained by the powered device 2a, and sends a charging request message for requesting the power sourcing equipment 1 to charge the electrical energy storage device.

Information Related to the Power Consumption Mode of the Powered Device

The indicating message for the electrical quantity of the electrical energy storage device is described above, and will not be further described. The information related to the power consumption mode of the powered device comprises whether the powered device is working under large power consumption mode or normal power consumption mode. The large power consumption mode may be, for example, the powered device 2a, namely the IP phone is in a call, the normal power consumption mode is for example the IP phone is idle.

An Information Related to a Recommended Charging Mode

In a variant embodiment, if the powered device 2a obtains the indicating information for the electrical quantity of the electrical energy storage device and the information related to the power consumption mode of the powered device, the powered device 2a may further determines a recommended charging mode for the charging device 1.

For example, the following information is initially or dynamically configured by the producer or the user: when the electrical quantity of the electrical energy storage device of the powered device satisfies a first predetermined threshold, and the powered device is under large power consumption mode, the powered device 2a recommends the power sourcing equipment 1 to charge the powered device continuously, namely in the emergency charging mode. For example, the electrical quantity left is less than 10% or 100 mAh or the electrical quantity that has been used is more than 90% or 900 mAh, and the powered device 2a is in a call; when the electrical quantity of the electrical energy storage device of the powered device satisfies a second predetermined threshold, and the powered device is under idle mode, the powered device 2a recommends the power sourcing equipment 1 to charge the powered device 2a periodically according to the time slot (alternatively in time sequence), namely using the normal charging mode, for example, the electrical quantity left is higher than 10% or 100 mAh or the electrical quantity that has been used is lower than 90% or 900 mAh, and the powered device 2a is under idle mode, then the normal charging mode will be applied; otherwise, even if the powered device 2a is under working mode, the electrical quantity left is more than 30% or 300 mAh or the electrical quantity that has been used is less than 70% or 700 mAh, the powered device 2a recommends the power sourcing equipment 1 to charge the powered device 2a in the normal charging mode.

On the powered device side, the present invention may be implemented by extending the Link Layer Discovery Protocol-Media Endpoint Discovery (LLDP-MED) and defining messages with different Type Length Value (TLV).

For example, one or more items of the followings are defined separately: the indicating information for electrical quantity, charging request message (or charging end message), power consumption mode related information and information related to a recommended charging mode. Besides, specific protocol may be defined, which also belongs to the protection scope of the present invention, in the embodiment described above, the interaction and compatibility of different devices are considered for the extension of the existing LLDP-MED protocol.

When the power sourcing equipment 1 receives the charging related information from the powered device 2a, the method of the present invention enters step S11, the power sourcing equipment 1 determines whether the predetermined charging condition is satisfied, if so, the method enters step S12, the power sourcing equipment 1 charges the electrical energy storage device of the powered device 2a. Specifically:

When the Charging Related Information Received by the Power Sourcing Equipment 1 from the Powered Device 2a Comprises the Charging Request Message The power sourcing equipment 1 determines that the charging condition is satisfied, namely, the power sourcing equipment 1 needs to charge the electrical energy storage device;

When the Charging Related Information Received by the Power Sourcing Equipment 1 from the Powered Device 2a Comprises the Information Related to a Recommended Charging Mode The power sourcing equipment 1 determines that the charging condition is satisfied, and the power sourcing equipment 1 charges the electrical energy storage device of the powered device 2a using the corresponding emergency charging mode/normal charging mode according to the charging mode recommended by the powered device 2a;

When the Charging Related Information Received by the Power Sourcing Equipment 1 from the Powered Device 2a Comprises the Electrical Quantity Related Information Instead of the Charging Request Message, The power sourcing equipment 1 further needs to determine according to the electrical quantity related information. Specifically, for example, configurations of the producer or the user for different powered devices are stored in the power sourcing equipment 1: for example, as for the powered device 2a, when the left electrical quantity of the electrical energy storage device is lower than the predetermined threshold, for example 30% or 150 mAh, or equivalently, the electrical quantity that has been used is higher than another predetermined threshold, for example, 70% or 350 mAh, the power sourcing equipment 1 determines that it is the indicating message indicating that the power sourcing equipment 1 needs to charge the powered device 2a. The power sourcing equipment 1 determines that the power sourcing equipment 1 needs to charge the electrical energy storage device, namely the predetermined charging condition is satisfied, according to this indicating message and according to the electrical quantity left/electrical quantity that has been used contained in the charging related information reported by the powered device 2a.

When the Charging Related Information Received by the Power Sourcing Equipment 1 from the Powered Device 2a Comprises the Information Related to the Electrical Quantity of the Electrical Energy Storage Device and the Information Related to the Power Consumption Mode of the Powered Device 2a

Then, when the power sourcing equipment 1 determines that the predetermined charging condition is satisfied, it is necessary to charge the powered device 2a, the power sourcing equipment 1 may further determines the charging mode to be applied to charge the powered device 2a.

For example, it is initially or dynamically configured by the producer or the user: when the electrical quantity of the electrical energy storage device of the powered device satisfies a first predetermined threshold, and the powered device is under large power consumption mode, then the power sourcing equipment charges the powered device continuously, namely the emergency charging mode is applied. For example, the electrical quantity left is lower than 10% or 100 mAh or the electrical quantity that has been used is higher than 90% or 900 mAh, and the powered device 2a is under large power consumption mode, such as the IP phone is in a call, or when the powered device is a web video, and is in the status of video compression and data transmission, that is, the power consumption of the powered device is large; when the electrical quantity of the electrical energy storage device of the powered device satisfies a second predetermined threshold, and the powered device is under standby mode, then the power sourcing equipment charges the powered device 2a periodically according to the time slot (alternatively in time sequence), namely using the normal charging mode. For example, the electrical quantity left is higher than 10% or 100 mAh or the electrical quantity that has been used is lower than 90% or 900 mAh, and the powered device 2a is under standby mode, then the normal charging mode will be applied; otherwise, even if the powered device 2a is under working mode, the electrical quantity left is more than 30% or 300 mAh or the electrical quantity that has been used is less than 70% or 700 mAh, normal charging mode will be applied.

Wherein, the first predetermined threshold and the second predetermined threshold are only illustrative, those skilled in the art may choose other threshold according to the practical situation.

For example, the powered device being used with less than 10% electrical quantity left has more than 30% electrical quantity left after being charged, or has been changed to standby status while still having less than 10% electrical quantity left, for example, an IP phone being used ends the call, then the power sourcing equipment 1 determines to change the charging mode from the emergency charging mode to the normal charging mode, to charge the powered device.

Then, in step S12, the power sourcing equipment 1 charges the electrical energy storage device of the powered device 2a. The power sourcing equipment applies normal charging mode or emergency charging mode to charge the electrical energy storage device of the powered device 2a. Of course, as a part of the powered device 2a, the electrical energy storage device may be integrated with the powered device, or may be separated from the powered device 2a. When the powered device 1 is under emergency charging mode, the power sourcing equipment 1 provides the powered device 2a with working power supply, while providing the electrical energy storage device 1 of the powered device 2a with charging power supply, which is a high efficient manner that reduces the consumption of the energy conversion, due to the fact that the powered device 2a consumes the electrical energy from the power sourcing equipment 1 directly, so as to maintain the proper operation of the powered device 2a. However, in a variant embodiment, if the charging path and the discharging path of the electrical energy storage device are separated, namely, if the electrical energy storage device may be charged while providing power supply to the powered device, the power sourcing equipment 1 may only provide charging power supply to the electrical energy storage device, and do not need to provide the working power supply to the powered device 2a, while the electrical energy storage device provides the powered device 2a with working power supply.

Then, the power sourcing equipment 1 ends the charging when the power sourcing equipment 1 detects the electrical quantity of the powered device 2a satisfied a certain threshold by detecting the voltage of the electrical energy storage device of the powered device 2a, for example, it is full or 80% charged, or according to the report of the powered device 2a that the charging has reached a certain threshold, for example, it is full or 80% charged. It can be understood, the threshold above may be configured by the producer of the powered device, and the value thereof can be defined according to the practical situation.

In a variant embodiment, for example, as for powered device being charged in the periodical shifting charging mode, there is a charging cycle for each powered device, which may be factory default or may be set dynamically by the user. When the power sourcing equipment 1 detects that the time for the periodic charging of a specific powered device has expired, or if the power sourcing equipment 1 receives a request from the powered device for requesting to exist the charging slot, the power sourcing equipment 1 stops charging the powered device.

In a variant embodiment, if the operation stability of the powered device is disregarded, in order to achieve supporting more powered devices at the same time, the power sourcing equipment 1 may charge the electrical energy storage device of all the powered devices in the periodical shifting charging mode. In contrast, in order to provide stable and reliable service to the powered device, the power sourcing equipment 1 may also provide the electrical energy storage device of all the powered devices with continuous charging mode.

In the above embodiments, the manner, wherein the powered device 2a reports to the power sourcing equipment 1, is applied, so as to notify that the power sourcing equipment 1 needs to charge the powered device 2a. In this manner, unnecessary signaling interaction is reduced; thereby the network bandwidth is reduced. Considering if the software failure occurs to the powered device, the powered device can not report to the power sourcing equipment 1 in time, the power sourcing equipment 1 can not obtain information about the powered device, in a variant embodiment, inquiring mode may be applied, namely before step S10, the method further comprises the following step:

The power sourcing device sends an inquiry message to the powered device periodically or non-periodically, so as to inquiry whether the powered device needs to be charged.

In the above embodiment, the information related to the power consumption mode of the powered device 2a is provided by the powered device 2a. In another embodiment, the power sourcing equipment 1 may determine the working mode of the powered device by detecting the data flow of certain port, so as to obtain the information related to the power consumption mode without having to rely on the report of the powered device 2a.

The present invention may be implemented by extending the Link Layer Discovery Protocol-Media Endpoint Discovery (LLDP-MED) and defining messages with different Type Length Value (TLV) for the power sourcing equipment 1.

For example, any one or more items of the following are defined separately: the indicating information for electrical quantity, charging request message (or charging end message), power consumption mode related information and information related to a recommended charging mode. Besides, specific protocol may be defined, which also belongs to the protection scope of the present invention, in the embodiment described above, the interaction and compatibility of different devices are considered for the extension of the existing LLDP-MED protocol.

When the power sourcing equipment 1 does not need to charge the powered device 2a, for example left electrical quantity of the electrical energy storage device is higher than a certain threshold, the method enters step SA, the electrical energy storage device of the powered device provides the powered device 2a with working power supply, at this time, the power sourcing equipment 1 may charge other powered device or may be in the standby status.

The power sourcing equipment in the Ethernet is described in the embodiments of the present invention. It should be understood by those skilled in the art, the present invention is not limited to the Ethernet, the present invention may also be adapted for the field bus powering over data pair, and for transmitting DC power supply over the field bus without contaminating the data.

Figure 4:
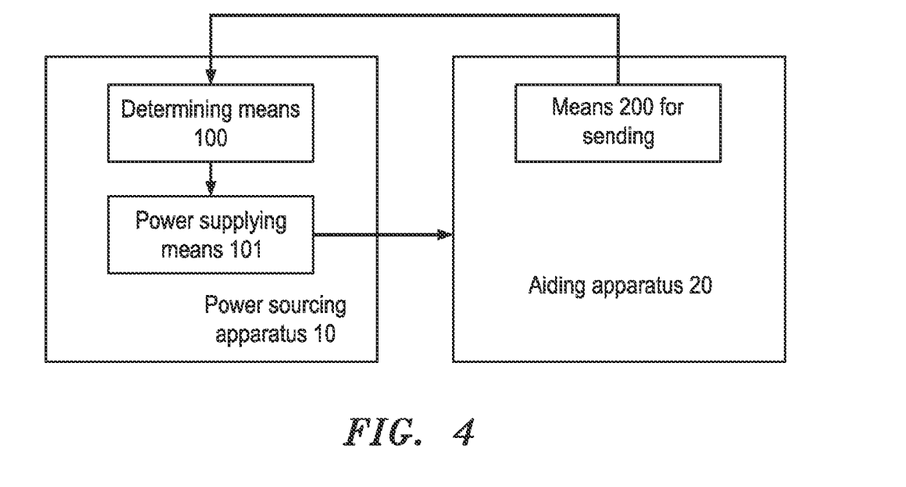
FIG. 4 shows a block diagram of an apparatus according to one embodiment of the invention.

Referring to FIG. 4 in combination with FIG. 1 and FIG. 3, the block diagram of one specific embodiment of the present invention is described in detail.

FIG. 4 shows a block diagram of an apparatus according to one embodiment of the invention. In FIG. 4, the power sourcing apparatus 10 is configured in the power sourcing equipment 1 of FIG. 1, wherein, the power sourcing apparatus 10 comprises the determining means 100 and the power supplying means 101.

The aiding apparatus 20 is configured in the powered device 2a of FIG. 1, wherein, the present invention is first described using the example where the powered device 2a comprises an IP phone. It can be understood by those skilled in the art, the powered device may be other devices that support 802.3af protocol. In the following, the example where the IP phone is the powered device 2 is described, and the present invention may also be applied to other powered device in the Ethernet power supply system. Wherein, the adding apparatus 20 comprised a means 200 for sending.

First, the means 200 for sending in the adding apparatus 20 sends a charging related information to the power sourcing equipment 1. The charging related information may comprise one or more of the following items:

An Indicating Information for the Electrical Quantity of the Electrical Energy Storage Device The indicating information for the electrical quantity may be an indicating information for the electrical quantity left, or may be an indicating information for the electrical quantity that has been used. It may be represented in a relative value form, or in an absolute value form. For example, the electrical quantity left may be represented as 10% in the relative value form, or the electrical quantity that has been used is 90%, the electrical quantity left is represented in the absolute value form as 50 mAh, or the electrical quantity that has been used is 1500 mAh.

It can be understood, that the powered device 2a may obtain the indicating information for the electrical quantity of the electrical energy storage device by the way of obtaining the voltage of the electrical energy storage device, due to that there exists a certain known relationship between the voltage of the battery and the electrical quantity left. Of course, the powered device 2a may obtain the electrical quantity left/used in other manners. Because it is known by those skilled in the art, the detailed description will be omitted here.

A Charging Request Message

In a variant embodiment, the aiding apparatus 20 further comprises a means for detecting, a means for comparing, and a means for generating message (not shown in the FIGS). After the means for detecting detects the electrical quantity information of the electrical energy storage device, the means for comparing further compares the electrical quantity information of the electrical energy storage device with a threshold configured initially or dynamically by the producer or the user, so as to determine whether it is necessary for the power sourcing equipment 1 to charge the electrical energy storage device.

For example, the configuration of the producer or the user is pre-stored in the powered device 2a: when the left electrical quantity of the electrical energy storage device is lower than a predetermined threshold, for example 30% or 100 mAh, or equivalently, the electrical quantity that has been used is higher than another predetermined threshold, for example, 70% or 1000 mAh, the powered device 2a determines an indicating message that the power sourcing equipment 1 needs to charge the powered device 2a. Thus the powered device 2a determines that it is necessary for the power sourcing equipment 1 to charge the electrical energy storage device, according to this indicating message, and according to the electrical quantity left/electrical quantity that has been used obtained by the powered device 2a, thus the means for generating messages generates a charging request message for requesting the power sourcing equipment 1 to charge the electrical energy storage device, and then the means 200 for sending sends the charging request message generated by the means for generating messages.

Information Related to the Power Consumption Mode of the Powered Device

The indicating information for the electrical quantity of the electrical energy storage device is described above, and will not be further described. The information related to the power consumption mode of the powered device comprises whether the powered device is working under large power consumption mode or normal power consumption mode. The large power consumption mode may be, for example, the powered device 2a, namely the IP phone is in a call, the normal power consumption mode is for example the IP phone is idle. Otherwise, if the powered device 2c, namely the web video is in the status of video compression and data transmission, the web video is under large power consumption status. The powered device 2c is usually in normal power consumption status when it is not transmitting data.

An Information Related to a Recommended Charging Mode

In a variant embodiment, if the powered device 2a obtains the indicating information for the electrical quantity of the electrical energy storage device and the information related to the power consumption mode of the powered device, the powered device 2a may further determines a recommended charging mode for the charging device 1.

For example, the following information is initially or dynamically configured by the producer or the user: when the electrical quantity of the electrical energy storage device of the powered device satisfies a first predetermined threshold, and the powered device is under large power consumption mode, the powered device 2a recommends the power sourcing equipment 1 to charge the powered device continuously, namely in the emergency charging mode. For example, the electrical quantity left is less than 10% or 100 mAh or the electrical quantity that has been used is more than 90% or 900 mAh, and the powered device 2a is in a call; when the electrical quantity of the electrical energy storage device of the powered device satisfies a second predetermined threshold, and the powered device is under idle mode, the powered device 2a recommends the power sourcing equipment 1 to charge the powered device 2a periodically according to the time slot (alternatively in time sequence), namely using the normal charging mode, for example, the electrical quantity left is higher than 10% or 100 mAh or the electrical quantity that has been used is lower than 90% or 900 mAh, and the powered device 2a is under idle mode, then the normal charging mode will be applied; otherwise, even if the powered device 2a is under working mode, the electrical quantity left is more than 30% or 300 mAh or the electrical quantity that has been used is less than 70% or 700 mAh, the powered device 2a recommends the power sourcing equipment 1 to charge the powered device 2a in the normal charging mode. Then the means 200 for sending sends the information related to a recommended charging mode to the power sourcing equipment 1 over a physical medium of transmission.

On the powered device side, the present invention may be implemented by extending the Link Layer Discovery Protocol-Media Endpoint Discovery (LLDP-MED) and defining messages with different Type Length Value (TLV).

For example, any one or more items of the followings are defined separately: the indicating information for electrical quantity, charging request message (or charging end message), power consumption mode related information and information related to a recommended charging mode. Besides, specific protocol may be defined, which also belongs to the protection scope of the present invention, in the embodiment described above, the interaction and compatibility of different devices are considered for the extension of the existing LLDP-MED protocol.

When the power sourcing equipment 1 receives the charging related information from the powered device 2a, the determining means 100 determines whether the predetermined charging condition is satisfied, if so, the power supplying means 101 charges the electrical energy storage device of the powered device 2a. Specifically:

When the Charging Related Information Received by the Power Sourcing Equipment 1 from the Powered Device 2a Comprises the Charging Request Message The determining means 100 determines that the charging condition is satisfied, namely, the power sourcing equipment 1 needs to charge the electrical energy storage device;

When the Charging Related Information Received by the Power Sourcing Equipment 1 from the Powered Device 2a Comprises the Information Related to a Recommended Charging Mode The determining means 100 determines that the charging condition is satisfied, and the power supplying means 101 charges the electrical energy storage device of the powered device 2a using the corresponding emergency charging mode/normal charging mode according to the charging mode recommended by the powered device 2a;

When the Charging Related Information Received by the Power Sourcing Equipment 1 from the Powered Device 2a Comprises the Electrical Quantity Related Information Instead of the Charging Request Message, The determining means 100 further needs to determine according to the electrical quantity related information. Specifically, for example, configurations of the producer or the user for different powered devices are stored in the power sourcing equipment 1: for example, as for the powered device 2a, when the left electrical quantity of the electrical energy storage device is lower than the predetermined threshold, for example 30% or 150 mAh, or equivalently, the electrical quantity that has been used is higher than another predetermined threshold, for example, 70% or 350 mAh, the The determining means 100 determines that it is the indicating message indicating that the power sourcing equipment 1 needs to charge the powered device 2a. The determining means 100 determines that the power sourcing equipment 1 needs to charge the electrical energy storage device, namely the predetermined charging condition is satisfied, according to this indicating message and according to the electrical quantity left/electrical quantity that has been used contained in the charging related information reported by the powered device 2a.

When the Charging Related Information Received by the Power Sourcing Equipment 1 from the Powered Device 2a Comprises the Information Related to the Electrical Quantity of the Electrical Energy Storage Device and the Information Related to the Power Consumption Mode of the Powered Device 2a Then, when the determining means 100 determines that the predetermined charging condition is satisfied, it is necessary to charge the powered device 2a, the power supplying means 101 may further determines the charging mode to be applied to charge the powered device 2a.

For example, it is initially or dynamically configured by the producer or the user: when the electrical quantity of the electrical energy storage device of the powered device satisfies a first predetermined threshold, and the powered device is under large power consumption mode, then the power supplying means 101 charges the powered device continuously, namely the emergency charging mode is applied. For example, the electrical quantity left is lower than 10% or 100 mAh or the electrical quantity that has been used is higher than 90% or 900 mAh, and the powered device 2a is under large power consumption mode, such as the IP phone is in a call, or when the powered device is a web video, and is in the status of video compression and data transmission, that is, the power consumption of the powered device is large; when the electrical quantity of the electrical energy storage device of the powered device satisfies a second predetermined threshold, and the powered device is under standby mode, then the power sourcing equipment charges the powered device 2a periodically according to the time slot (alternatively in time sequence), namely using the normal charging mode. For example, the electrical quantity left is higher than 10% or 100 mAh or the electrical quantity that has been used is lower than 90% or 900 mAh, and the powered device 2a is under standby mode, then the normal charging mode will be applied; otherwise, even if the powered device 2a is under working mode, the electrical quantity left is more than 30% or 300 mAh or the electrical quantity that has been used is less than 70% or 700 mAh, normal charging mode will be applied by the power supplying means 101.

Wherein, the first predetermined threshold and the second predetermined threshold are only illustrative, those skilled in the art may choose other threshold according to the practical situation.

For example, the powered device being used with less than 10% electrical quantity left has more than 30% electrical quantity left after being charged, or has been changed to standby status while still having less than 10% electrical quantity left, for example, an IP phone being used ends the call, then the power supplying means 101 determines to change the charging mode from the emergency charging mode to the normal charging mode, to charge the powered device.

Namely, the power supplying means 101 charges the electrical energy storage device of the powered device 2*a*. The power sourcing equipment applies normal charging mode or emergency charging mode to charge the electrical energy storage device of the powered device 2*a*. Of course, as a part of the powered device 2*a*, the electrical energy storage device may be integrated with the powered device, or may be separated from the powered device 2*a*. When the powered device 1 is under emergency charging mode, the power sourcing equipment 1 provides the powered device 2*a* with working power supply, while providing the electrical energy storage device 1 of the powered device 2*a* with charging power supply, which is a high efficient manner that reduces the consumption of the energy conversion, due to the fact that the powered device 2*a* consumes the electrical energy from the power sourcing equipment 1 directly, so as to maintain the proper operation of the powered device 2*a*. However, in a variant embodiment, if the charging path and the discharging path of the electrical energy storage device are separated, namely, if the electrical energy storage device may be charged while providing power supply to the powered device, the power sourcing equipment 1 may only provide charging power supply to the electrical energy storage device, and do not need to provide the working power supply to the powered device 2*a*, while the electrical energy storage device provides the powered device 2*a* with working power supply.

Then, the power sourcing equipment 1 ends the charging when the power sourcing equipment 1 detects the electrical quantity of the powered device 2*a* satisfied a certain threshold by detecting the voltage of the electrical energy storage device of the powered device 2*a*, for example, it is full or 80% charged, or according to the report of the powered device 2*a* that the charging has reached a certain threshold, for example, it is full or 80% charged. It can be understood, the threshold above may be configured by the producer of the powered device, and the value thereof can be defined according to the practical situation.

In a variant embodiment, for example, as for powered device being charged in the periodical shifting charging mode, there is a charging cycle for each powered device, which may be factory default or may be set dynamically by the user. When the power sourcing equipment 1 detects that the time for the periodic charging of a specific powered device has expired, or if the power sourcing equipment 1 receives a request from the powered device for requesting to exist the charging slot, the power sourcing equipment 1 stops charging the powered device.

In a variant embodiment, if the operation stability of the powered device is disregarded, in order to achieve supporting more powered devices at the same time, the power supplying means 101 may charge the electrical energy storage device of all the powered devices in the periodical shifting charging mode. In contrast, in order to provide stable and reliable service to the powered device, the power supplying means 101 may also provide the electrical energy storage device of all the powered devices with continuous charging mode.

In the above embodiments, the manner, wherein the powered device 2*a* reports to the power sourcing equipment 1, is applied, so as to notify that the power sourcing equipment 1 needs to charge the powered device 2*a*. In this manner, unnecessary signaling interaction is reduced; thereby the network bandwidth is reduced. Considering if the software failure occurs to the powered device, the powered device can not report to the power sourcing equipment 1 in time, the power sourcing equipment 1 can not obtain information about the powered device, in a variant embodiment, inquiring mode may be applied, namely the power sourcing apparatus 10 further comprises a means for inquiring (not shown in the FIGS):

The means for inquiring sends an inquiry message to the powered device periodically or non-periodically, so as to inquiry whether the powered device needs to be charged.

In the above embodiment, the information related to the power consumption mode of the powered device 2*a* is provided by the means 200 for sending. In another embodiment, the power sourcing equipment 1 may determine the working mode of the powered device by detecting the data flow of certain port, so as to obtain the information related to the power consumption mode without having to rely on the report of the powered device 2*a*.

The present invention may be implemented by extending the Link Layer Discovery Protocol-Media Endpoint Discovery (LLDP-MED) and defining messages with different Type Length Value (TLV) for the power sourcing equipment 1.

For example, one or more items of the following are defined separately: the indicating information for electrical quantity, charging request message (or charging end message), power consumption mode related information and information related to a recommended charging mode. Besides, specific protocol may be defined, which also belongs to the protection scope of the present invention, in the embodiment described above, the interaction and compatibility of different devices are considered for the extension of the existing LLDP-MED protocol.

When the power sourcing equipment 1 does not need to charge the powered device 2*a*, for example left electrical quantity of the electrical energy storage device is higher than a certain threshold, the electrical energy storage device of the powered device provides the powered device 2*a* with working power supply, at this time, the power sourcing equipment 1 may charge other powered device or may be in the standby status.

The power sourcing equipment in the Ethernet is described in the embodiments of the present invention. It should be understood by those skilled in the art, the present invention is not limited to the Ethernet, the present invention may also be adapted for the field bus powering over data pair, and for transmitting DC power supply over the field bus without contaminating the data.

The above is the description of the embodiments of the present invention. However, the present invention is not limited to specific system, apparatus or specific protocol. Those skilled in the art may carry out various modification or variation in the scope of the appended claims.

The invention claimed is:

1. A method for use in a power sourcing equipment to power a powered device, the method comprising the steps of:
   receiving, at the power sourcing equipment, charging related information from the powered device, wherein the charging related information comprises a quantity of power needed, a power consumption mode of the powered device, and charging modes of the powered device that comprise an emergency charging mode for a remaining electrical quantity of less than ten percent and a normal charging mode otherwise;

determining, at the power sourcing equipment, whether a predetermined charging condition is satisfied according to the received charging related information; and charging continuously, via the power sourcing equipment, an electrical energy storage device of the powered device, or charging periodically, via the power sourcing equipment, the electrical energy storage device according to a time slot and to the received charging related information when the predetermined charging condition is satisfied, the electrical energy storage device being used to provide the powered device with a working power supply.

2. The method according to claim 1, wherein the step of charging continuously, via the power sourcing equipment, the electrical energy storage device further comprises the step of:
providing the powered device with a working power supply.

3. The method according to claim 1, wherein the step of charging continuously, via the power sourcing equipment, the electrical energy storage device further comprises the step of:
charging continuously, via the power sourcing equipment, the electrical energy storage device of the powered device over a physical medium of transmission, or charging periodically, via the power sourcing equipment, the electrical energy storage device over the physical medium of transmission according to the time slot and to the received charging related information when the predetermined charging condition is satisfied.

4. The method according to claim 1, wherein the received charging related information further comprises a charging request message for the requested charging.

5. The method according to claim 1, wherein the received charging related information comprises indication information for the electrical quantity of the electrical energy storage device, the predetermined charging condition further comprising the steps of:
comparing, at the power sourcing equipment, the indication information for the electrical quantity with a predetermined threshold; and
determining, at the power sourcing equipment, to charge the electrical energy storage device according to the results of the comparison.

6. The method according to claim 1, wherein the power consumption mode comprises a large power consumption mode or a normal power consumption mode.

7. The method according to claim 1, wherein before the step of determining whether a predetermined charging condition is satisfied, the method further comprises the step of:
sending, at the power sourcing equipment, an inquiry message to the powered device, the inquiry message being used to request the charging related information.

8. A method for use in a powered device to assist power sourcing equipment to supply power to the powered device, wherein the powered device comprises an electrical energy storage device, the method comprising the step of:
sending, at the powered device, charging related information to the power sourcing equipment, wherein the charging related information comprises a quantity of power needed, a power consumption mode of the powered device, and charging modes of the powered device that comprise an emergency charging mode for a remaining electrical quantity of less than ten percent and a normal charging mode otherwise; and receiving, at the powered device, a continuous charging of the electrical energy storage device from the power sourcing equipment, or a periodic charging of the electrical energy storage device according to a time slot and to the received charging related information when a predetermined charging condition is satisfied.

9. The method according to claim 8, wherein the method further comprises the step of:
receiving, at the powered device, a working power supply via the electrical energy storage device.

10. The method according to claim 8, wherein the step of sending, at the powered device, charging related information further comprises the step of indicating, at the powered device, information for an electrical quantity of the electrical energy storage device.

11. The method according to claim 8, wherein the charging related information further comprises a charging request message;
the method further comprises the following steps before the step of sending:
detecting, at the powered device, electrical quantity information of the electrical energy storage device;
comparing, at the powered device, the electrical quantity information with a pre-determined threshold; and
generating, at the powered device, the charging request message when the results of the comparison determine that it is necessary to charge the electrical energy storage device.

12. A power sourcing apparatus in a power sourcing equipment to power a powered device, wherein the powered device comprises:
a determining means configured to determine whether a predetermined charging condition is satisfied according to received charging related information from the powered device, wherein the received charging related information comprises a quantity of power needed, a power consumption mode of the powered device, and charging modes of the powered device that comprise an emergency charging mode for a remaining electrical quantity of less than ten percent and a normal charging mode otherwise; and
a power supplying means configured to charge continuously an electrical energy storage device of the powered device, or charge periodically the electrical energy storage device according to a time slot and to the received charging related information when the predetermined charging condition is satisfied, the electrical energy storage device being used to provide the powered device with a working power supply.

13. An aiding apparatus in a powered device configured to aid a power sourcing equipment in powering the powered device, wherein the powered device comprises an electrical energy storage device, the aiding apparatus being configured to
send a charging related information to the power sourcing equipment, wherein the charging related information comprises a quantity of power needed, a power consumption mode of the powered device, and charging modes of the powered device that comprises an emergency charging mode for a remaining electrical quantity of less than ten percent and a normal charging mode otherwise; and
receive a continuous charging of the electrical energy storage device from the power sourcing equipment, or a periodic charging of the electrical energy storage device according to a time slot and to the charging related information when a predetermined charging condition is satisfied.

14. The method according to claim 1, wherein the electrical energy storage device of the powered device is separated from the powered device.

15. The method according to claim 1, further comprising the step of stopping, at the power sourcing equipment, the periodic charging of the powered device after detecting that a time for the periodic charging has expired.

* * * * *